(12) United States Patent
Sauder et al.

(10) Patent No.: US 7,584,707 B2
(45) Date of Patent: Sep. 8, 2009

(54) WEAR RESISTANT SEED TUBE FOR AN AGRICULTURAL PLANTER

(75) Inventors: Derek A. Sauder, Tremont, IL (US); Chad E. Plattner, Tremont, IL (US); Brad A. Wiegand, Mackinaw, IL (US)

(73) Assignee: Precision Planting, Inc., Tremont, IL (US)

( * ) Notice: Subject to any disclaimer, the term of this patent is extended or adjusted under 35 U.S.C. 154(b) by 0 days.

(21) Appl. No.: 12/064,056

(22) PCT Filed: Aug. 17, 2006

(86) PCT No.: PCT/US2006/032146

§ 371 (c)(1),
(2), (4) Date: Feb. 18, 2008

(87) PCT Pub. No.: WO2007/024624

PCT Pub. Date: Mar. 1, 2007

(65) Prior Publication Data

US 2008/0236461 A1 Oct. 2, 2008

Related U.S. Application Data

(60) Provisional application No. 60/710,003, filed on Aug. 19, 2005.

(51) Int. Cl.
*B65H 3/08* (2006.01)
(52) U.S. Cl. .................. 111/140; 111/164; 111/170; 111/177; 111/187; 111/195; 222/567; 222/575
(58) Field of Classification Search ............... 111/140, 111/164, 170, 177, 187, 195, 200, 127, 152, 111/124; 222/567, 566, 575; 221/211, 312 R; 193/2 R, 4, 5; 239/589, 592, 593, 597, 601
See application file for complete search history.

(56) References Cited

U.S. PATENT DOCUMENTS

5,664,507 A 9/1997 Bergland et al.

*Primary Examiner*—Christopher J. Novosad
(74) *Attorney, Agent, or Firm*—Larkin Hoffman Daly & Lindgren, Ltd.; Thomas J. Oppold (57) ABSTRACT

A seed tube for an agricultural planter having a rearwardly curving forward wall, a rearwardly curving rearward wall and opposing sidewalls defining a seed passageway which curves rearwardly from an upper ingress end toward a lower egress end. Wear resistant material is disposed proximate the egress end which provides a point of first contact with the opener disks thereby preventing appreciable wear of the egress end of the seed tube.

21 Claims, 9 Drawing Sheets

WEAR RESISTANT SEED TUBE FOR AN AGRICULTURAL PLANTER

BACKGROUND OF THE INVENTION

It is well recognized that proper and uniform spacing of seed in the furrow is essential to maximizing crop yield. Recent advances in metering technology have resulted in seed meters capable of singulating seed extremely well under field planting conditions. However, in order to achieve optimum consistency and accuracy of seed spacing, attention must be paid to every detail of the operating condition of the entire planter row unit, including the seed delivery tube, which can significantly effect seed spacing after the seeds are discharged by the seed meter.

Conventional seed tubes are made of injection molded plastic or polymer materials that can wear rapidly when in contact with the steel opening disk. As the tube wears and the plastic sidewall becomes thin, the sidewall is more susceptible to bending inward which can effect the ideal trajectory of the seed as it exits the seed tube. Additionally or alternatively, wearing of the sidewall can cause a "burr" or lip to form at the egress end of the tube, also effecting the ideal trajectory of the seed as it exits the tube.

Conventional seed delivery tubes are susceptible to wear for a variety of reasons. As identified above, one of the primary reasons for seed tube wear is contact with the furrow opening disks. Seed tube-to-opener disk contact may occur under a number of circumstances. For example, as the opening disks wear and shims are removed in order to maintain the proper disk-to-disk spacing, the disks tend to shift inward until they are in contact with the lower edge of the seed tube. This contact with the seed disk can cause significant wear to the seed tube.

Another reason contact with the opener disks can occur may be due to improper alignment of the seed tube within the row unit. For example, seed tubes generally have a seed sensor secured with tie straps to the middle portion of the tube. The bulk of the seed sensor wires and straps can push or bias the seed tube off-center, causing it to rub against the opener disk.

Yet another reason for tube-to-disk contact resulting in wear of the seed tube may be due to the opening disks flexing inward during planting operations, especially during planting in no-till conditions.

In addition to effecting seed spacing, high wear rates of conventional seed tubes also cause the operator to incur high replacement costs as the tubes need to be replaced yearly in order to maintain optimum performance.

Attempts have been made to minimize seed tube wear problems by various methods, all of which have heretofore been directed toward some means of holding the tube in the center of the row unit opener. One such attempt at keeping the tube in the center of the opener consists of a molded plastic bracket as shown in U.S. Pat. No. 5,664,507 to Bergland. This bracket snaps in place over the seed tube guard to keep the tube centered. Experience has shown that this bracket does not eliminate contact between the tube and opener disks and therefore does not solve the wear problem.

Another recent attempt to keep the seed tube centered within the opener is a seed tube guard that has a bracket welded to it that effectively creates wings to constrain or hold the seed tube within in the center of the row. The wings of the welded bracket design can bend during use thereby failing to eliminate the wear problem. Yet another design is an investment-cast seed tube guard wherein the wings are an integral piece of the part.

Still other efforts by original equipment manufacturers have attempted to utilize a sheet metal bracket mounted to the opener disk shaft to hold the tube in the center of the opener.

All of the foregoing these attempted improvements are predicated upon the supposition that if the tube is held in the center of the furrow, it will not contact the disks and therefore will not wear. Rather than attempting to ensure the seed tube remains centered within the opener, a more ideal solution is to ensure that the seed tube does not significantly wear if and when the seed tube does eventually contact the opener disks. Minimizing wear of the seed tube such that the trajectory of the seed is not affected, provides the advantage of increased performance and reduced maintenance costs and ensures optimum consistency and accuracy of seed placement within the furrow.

SUMMARY

A seed tube for an agricultural planter having a rearwardly curving forward wall, a rearwardly curving rearward wall and opposing sidewalls defining a seed passageway which curves rearwardly from an upper ingress end toward a lower egress end. Wear resistant material is disposed proximate the egress end which provides a point of first contact with the opener disks thereby preventing appreciable wear of the egress end of the seed tube.

DETAILED DESCRIPTION

Figure 1:
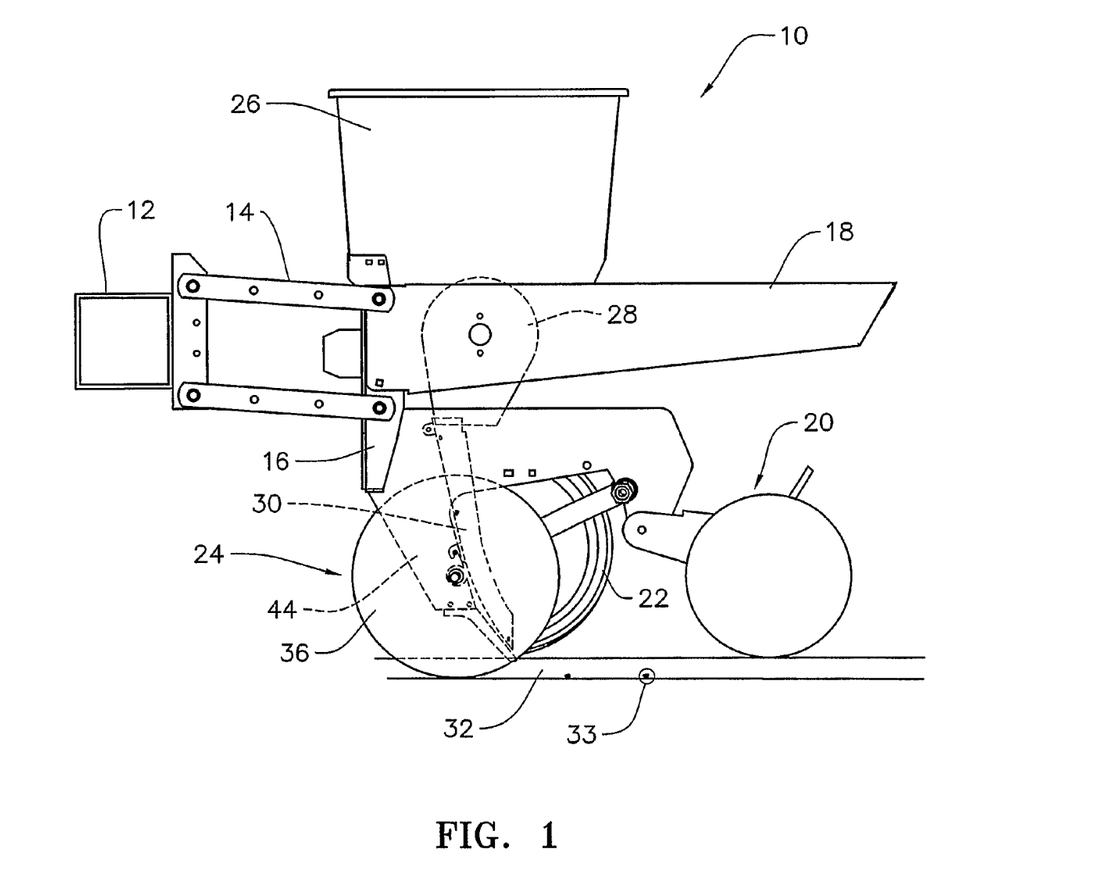
FIG. 1 is a side elevation view of a conventional planter row unit.

Referring now to the drawings, wherein like reference numerals designate identical or corresponding parts throughout the several views, FIG. 1 illustrates a side elevation view of a conventional planter row unit 10. It should be understood that the planter row unit 10 is one of a plurality of transversely spaced individual row units that comprise the planter implement.

Each row unit 10 is mounted to the transverse main frame 12 of the planter implement through a parallel arm linkage 14. A row unit frame 16 attaches to the parallel arm linkage 14 and supports a hopper beam 18. Also supported by the row unit frame 16 is a furrow closing system 20, and a furrow opener 24 with depth gauge wheels 22. The furrow opener 24 creates a V-shaped furrow 32 in the ground. The hopper beam 18, in turn, supports a seed hopper 26. The seed hopper contains a supply of seed 33 which is metered and dispensed by the seed meter 28. The seed meter 28 ideally discharges or meters singular seeds 33 at uniformly spaced intervals into the seed tube 30 which then directs the seed 33 downwardly and rearwardly where the seed is dispensed into the V-shaped furrow 32. The deposited seed 33 in the furrow 32 is then covered with soil by the furrow closing system 20.

Figure 2:
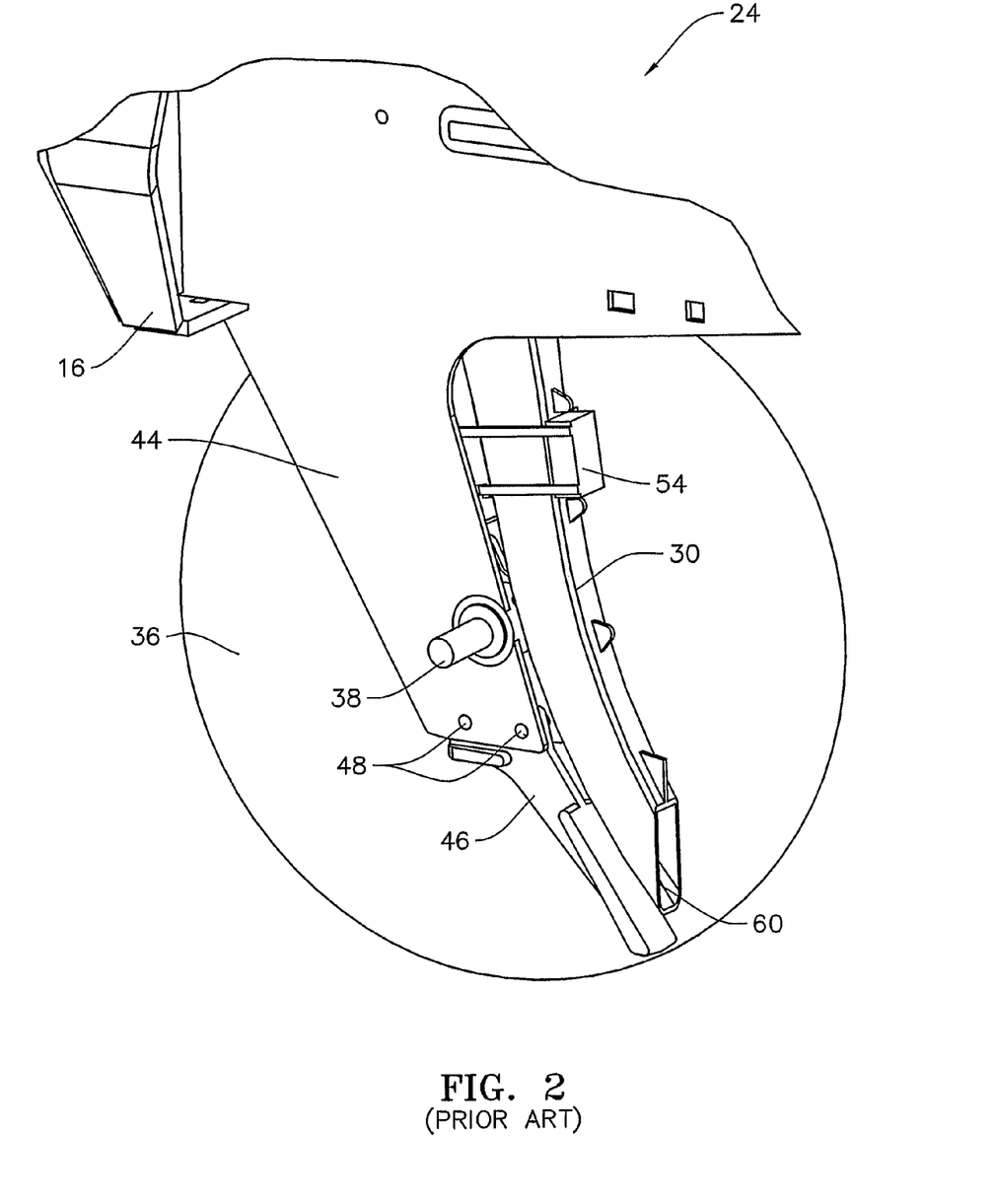
FIG. 2 is a detailed perspective view of the furrow opener of the conventional planter row unit of FIG. 1 with one of the opener disks removed for clarity.
Figure 3:
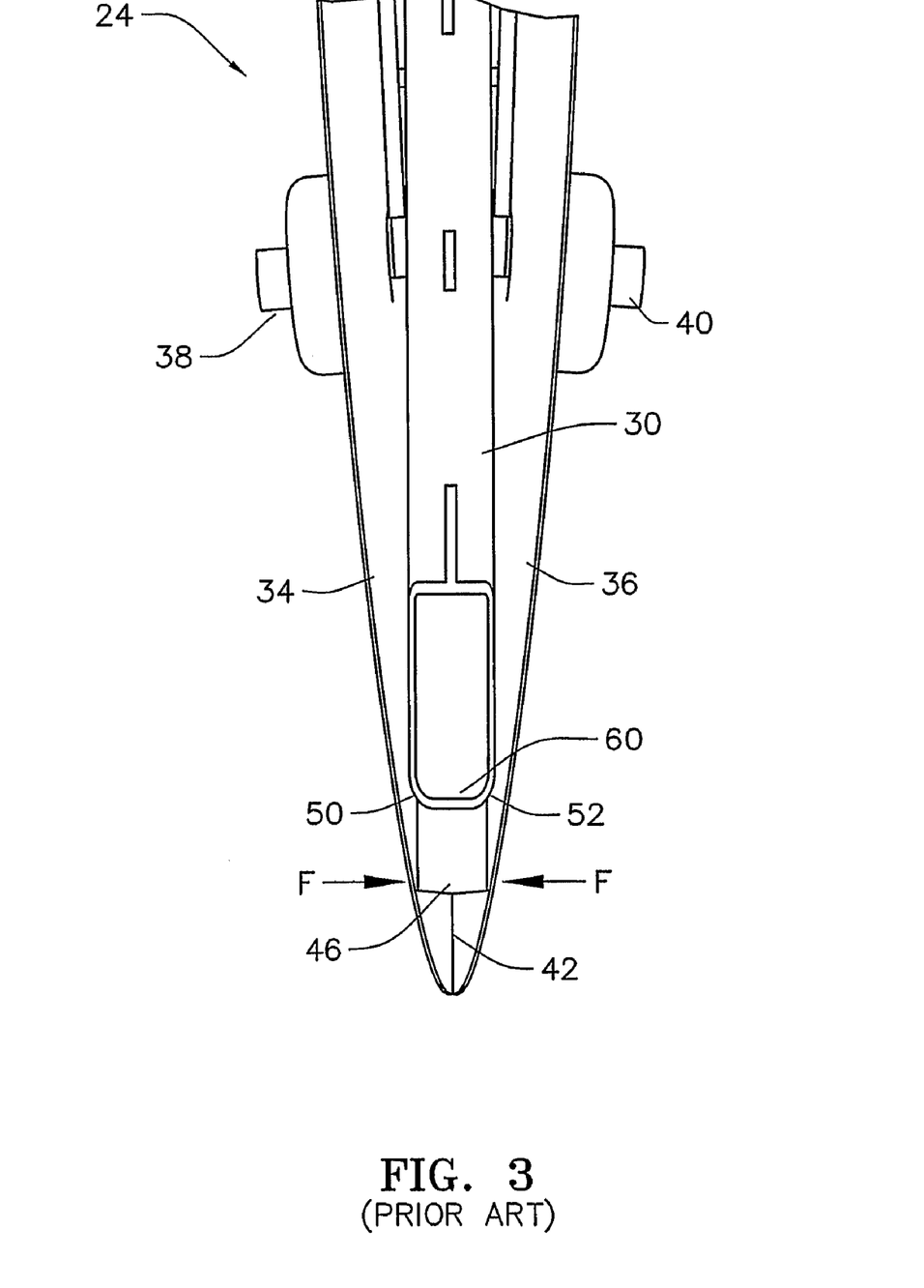
FIG. 3 is a rear elevation view of the furrow opener of FIG. 1 to illustrate how closely positioned the egress end of the seed tube is to the opener disks even when properly centered between the opener disks.

Referring now to FIGS. 2 and 3, the furrow opener 24 is typically comprised of a pair of disks 34, 36 rotatably mounted on shafts 38, 40 at a slight angle such that the two disks 34, 36 contact each other at a point 42 slightly above the bottom of the disks 34, 36 in order to cut the V-shape furrow 32 into the soil surface as the planter traverses the field. In FIG. 2, the left disk 34 is removed for clarity. The shafts 38, 40 are supported by a downwardly extending shank 44 forming a part of the row unit frame 16.

It should be understood that during planting operations as the opener 24 moves through the soil, the disks 34, 36 may be forced inwardly toward one another. FIG. 3 shows the force F that may cause the disks 34, 36 to move toward one another. To resist the inward force F and to minimize the amount of inward deflection of the disks, in many convention row units 10, a seed tube guard 46 (sometimes referred to as a blade separator) is provided. The guard 46 is typically mounted to the shank 44 by two roll pins 48. It should therefore be appreciated that, over time, both the disks 34, 36 and the guard 46 will wear. As understood by those skilled in the art, to compensate for the wear of the disks, which, over time, eventually become smaller in diameter, shims (not shown) located on the shafts 38, 40 are removed, thus permitting the disks 34, 36 to move closer together to maintain the contact point 42 of the forward edge of the disks 34, 36. As the disks 34, 36 move closer together, and as the tube guard 46 wears, the more likely the disks 34, 36 will come into contact with the seed tube 30 causing unwanted wear of the seed tube 30.

FIG. 3 best illustrates that the lower edges 50, 52 of seed tube 30 are the areas most vulnerable to coming into contact with the opener disks 34, 36 due to the proximity between these elements. As previously identified, contact between the seed tube 30 and the disks 34, 36 may result from the removal of the shims causing the disks to move inwardly toward the seed tube 30, or from the disks 34, 36 flexing inward toward the tube 30. As should also be appreciated, the lower edges 50, 52 are more vulnerable to coming into contact with the disks 34, 36 if the tube 30 is even slightly off-center within the row unit, such as, for example, from being pushed or biased toward one side or the other due to the mounting of the seed sensor 54 (FIG. 2) on the tube 30.

The result of any of the aforementioned causes of tube-to-disk contact is that the bottom edge of the seed tube 30 may become deformed. The most typical deformity is the creation of a lip or burr caused by the plastic being forced to turn inward or upwardly at the egress end 60 of the seed tube. Such lips, burs or other deformities may deflect the seed 33 as it exits the egress end 60 of the tube 30 thereby effecting the ideal or intended trajectory of the seed 33 upon exit of the tube, which, in turn, may result in misplaced seeds or uneven spacing between seeds 33 within the furrow 32.

Figure 4:
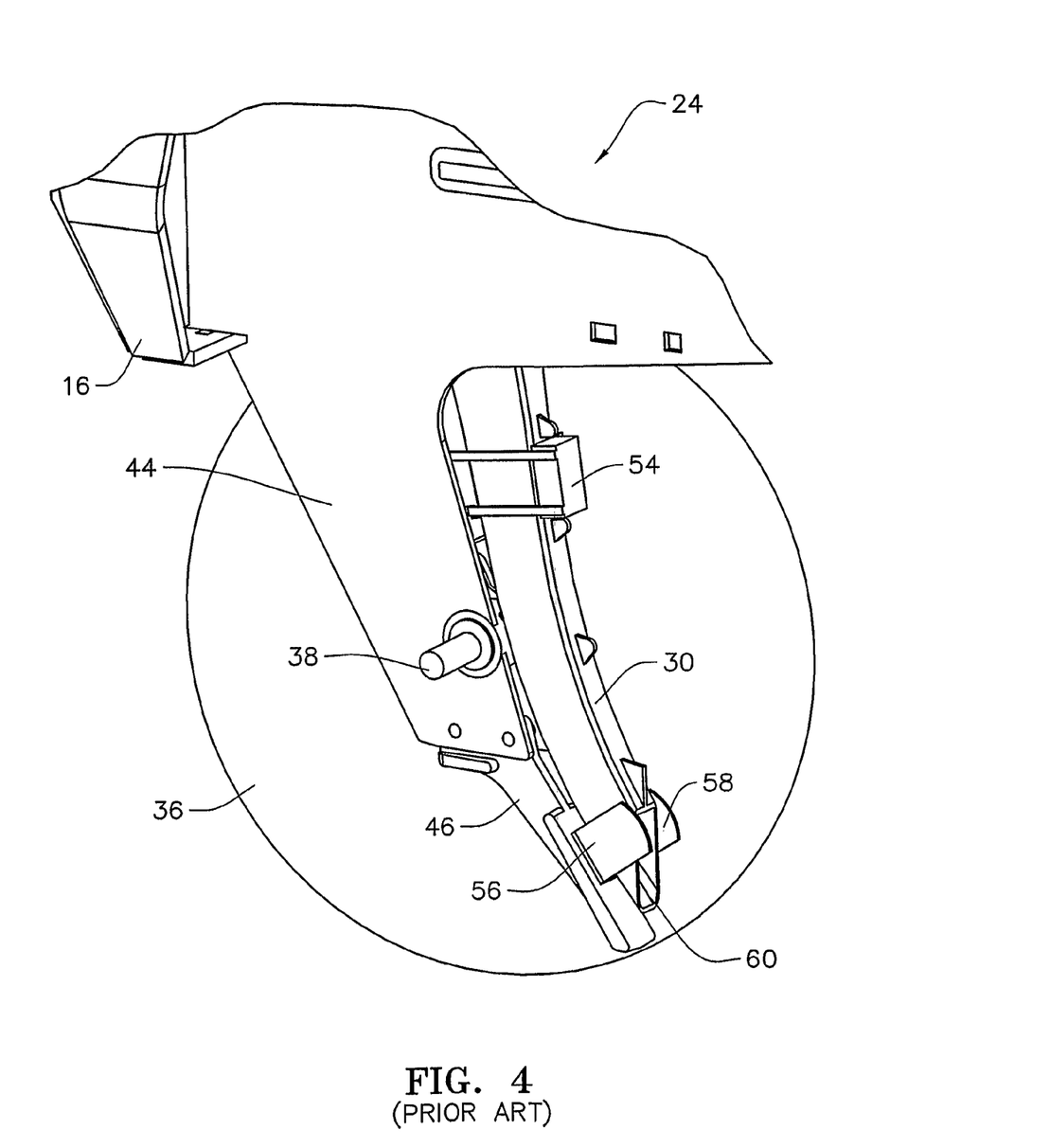
FIG. 4 is a perspective view showing one prior-art attempt at resolving the wear issue by constraining the egress end of the seed tube between ears extending from the seed tube guard.

Having illustrated the basic mechanisms by which seed tube wear may occur and the associated problems in achieving desired seed spacing, a brief discussion of previous attempts to maintain the seed tube centered within the opener is now presented. FIG. 4 shows one type of modified seed tube guard 46 from that shown in FIG. 2. In FIG. 4, the guard 46 includes ears 56, 58 disposed on either side of the tube 30. The ears 56, 58 serve to hold the seed tube 30 in the center of the opener 24 and away from the disks 34, 36. There are many alternative designs that have been used by various manufacturers over recent years. All of these designs, while varying in specific design details, rely upon two plastic or metal ears to hold the tube in the center of the opener. Such designs are based on the flawed assumption that if the tube 30 is held centered within the opener 24, the tube 30 will not be susceptible to wear.

Figures 5, 6:
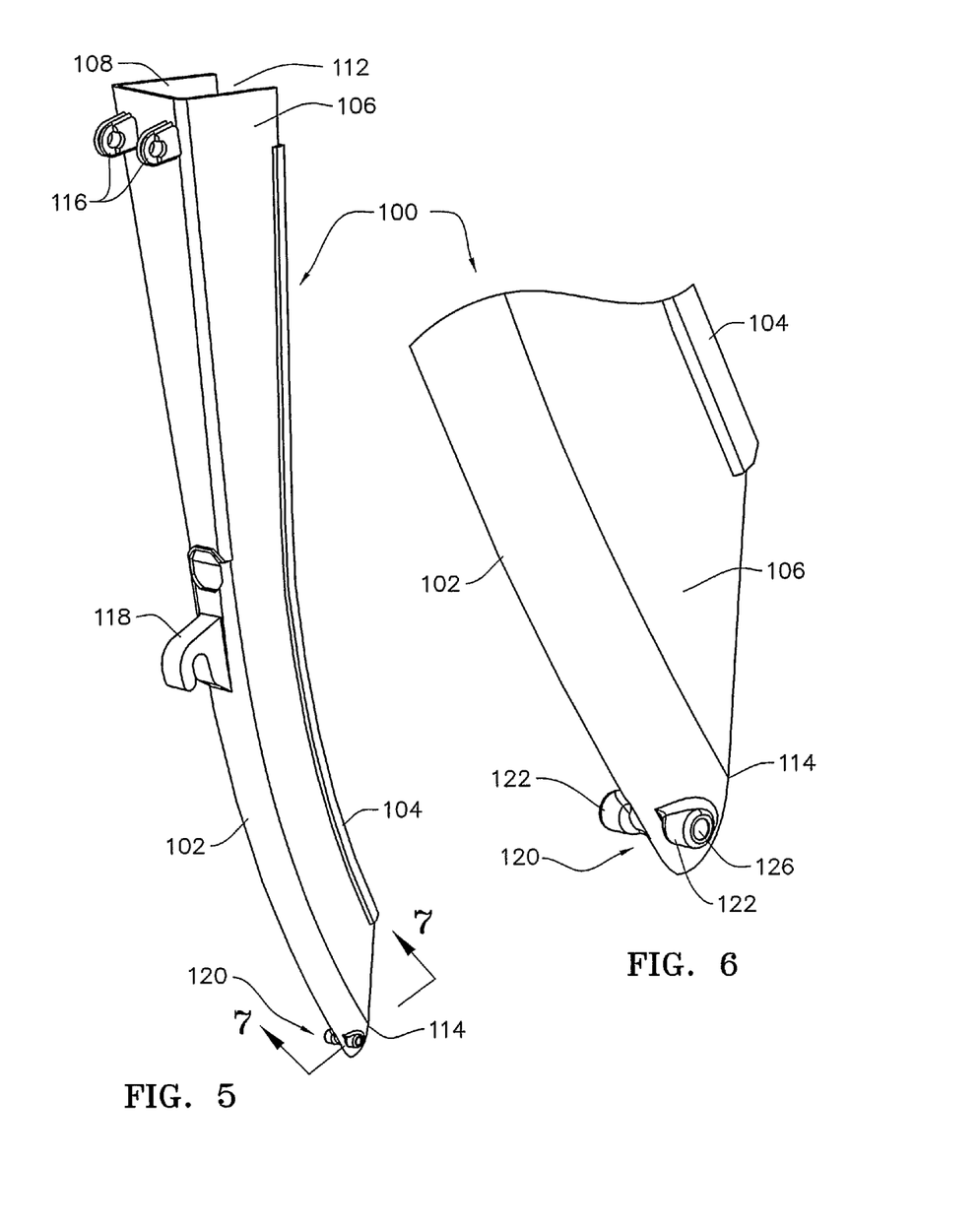
FIG. 5 is a perspective view of one embodiment of the wear resistant seed tube of the present invention.
FIG. 6 is a detailed perspective view of the egress end of the wear resistant seed tube of FIG. 5.

Referring now to FIGS. 5 and 6, one embodiment of a wear resistant seed tube 100 of the present invention is illustrated. As is conventional, the wear resistant seed tube 100 has a rearwardly curving forward wall 102, a rearwardly curving rearward wall 104 and opposing sidewalls 106, 108 defining a seed passageway 110 (FIG. 7) which curves rearwardly from an upper ingress end 112 toward a lower egress end 114. Seeds 33 enter the ingress end 112 of the seed tube 100 upon being discharged by the seed meter 28. The tube 100 may include upper mounting ears 116 and a mounting hook 118 for attachment to the row unit frame 16 and shank 44 as is conventional. It should be appreciated that other means for mounting or support the wear resistant seed tube 100 on the row unit 10 may be equally suitable and therefore the present invention should not be construed as being limited to any particular tube mounting or support means.

FIG. 6 illustrates a detailed view of the egress end 114 of the wear resistant seed tube 100, which as identified above is the portion of the seed tube most likely to come in contact with the opener disks 34, 36 and therefore experience the most wear during operation. In order to prevent substantial wear, the egress end 114 of the tube 100 is preferably protected by a wear member 120 that can withstand continuous and/or repeated contact with the opening disks 34, 36. The wear member 120 may be secured to the seed tube 100 by various means including adhering or bonding to the sidewalls 106, 108 and/or the forward wall 102, or by press-fitting or insert-molding the wear member 120 into the walls 102, 106, 108 of the tube 100. It should be appreciated that other means for attaching or incorporating a wear member proximate the egress end 114 of the seed tube 100 may be equally suitable and therefore the present invention should not be construed as being limited to any particular type of wear member 120 or means for attaching or incorporating a wear member proximate the egress end 114 of the tube 100.

Figure 7:
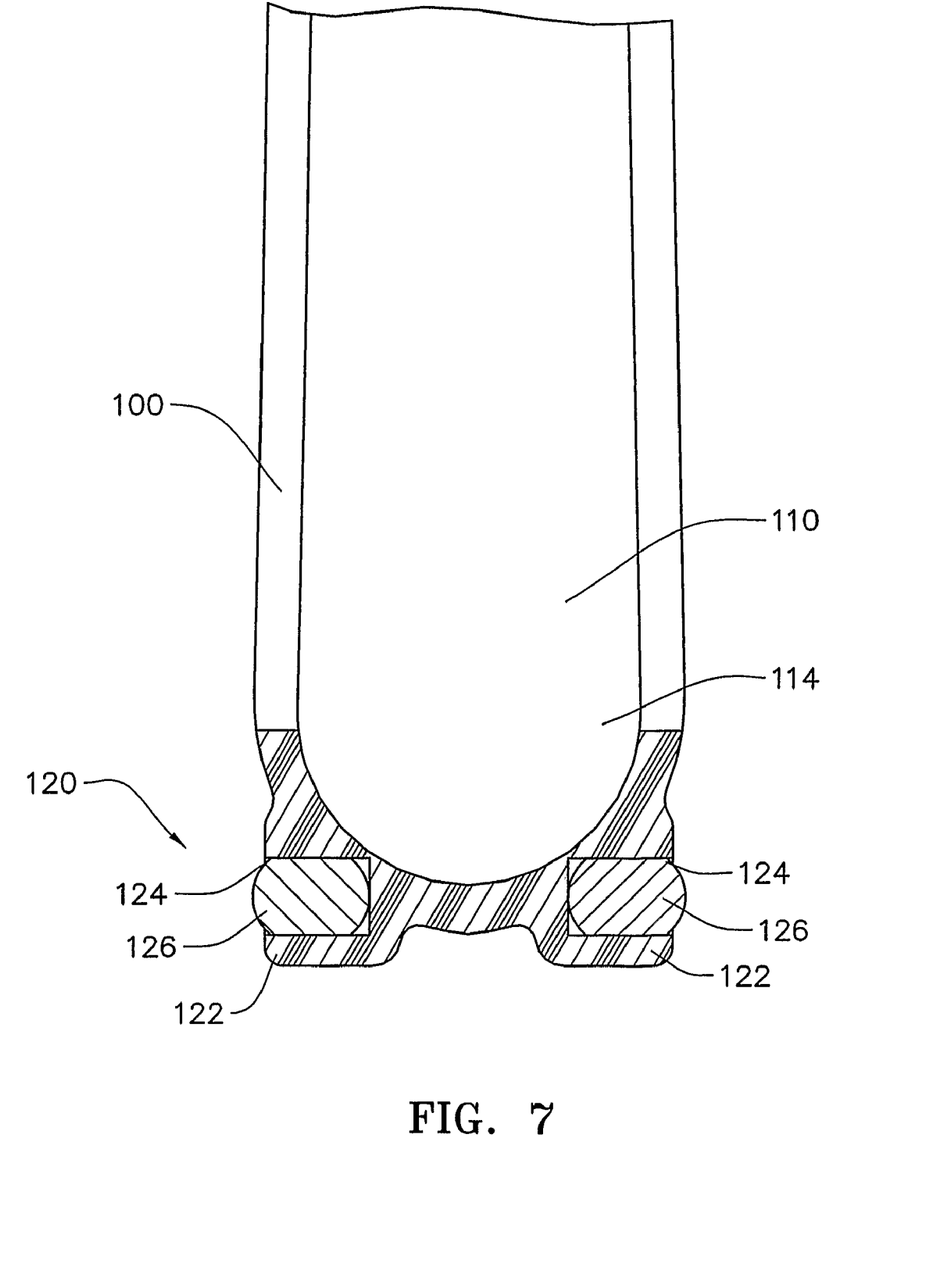
FIG. 7 is a cross-sectional view of the egress end of the wear resistant seed tube of FIG. 5 as viewed along lines 7-7 of FIG. 5.

FIG. 7 illustrates a cross-sectional view of the egress end 114 of the seed tube 100 as viewed along lines 7-7 of FIG. 5. In this embodiment, a cylindrical boss 122 having a bore 124 is preferably molded on each side of the tube 100. A cylindrical rod 126, preferably of tungsten carbide or other suitable wear resistant material, is preferably press-fit into each bore 124 in the bosses 122. The rod 126 is preferably rounded or spherical in shape in order to minimize friction with the disk 34, 36. It has been determined that depth of the bore 124 and length of the rod 126 is important in providing the proper retention of the rod 126. During operation, as the rod 126 contacts the disks 34, 36, heat may be generated which may cause the bosses 122 to soften, permitting the rods 126 to work loose. Accordingly, it is preferable to provide a material with sufficient heat conducting capacity and high enough melting temperature for molding the tube 100, or at least the bosses 122. In a preferred embodiment, the rod 126 is ⅛ inch in diameter and its length is 3/16 inch. A preferred material for the tube 100 or boss 122 is a durable polymer material such as nylon or thermoplastic polyurethane.

Figure 8:
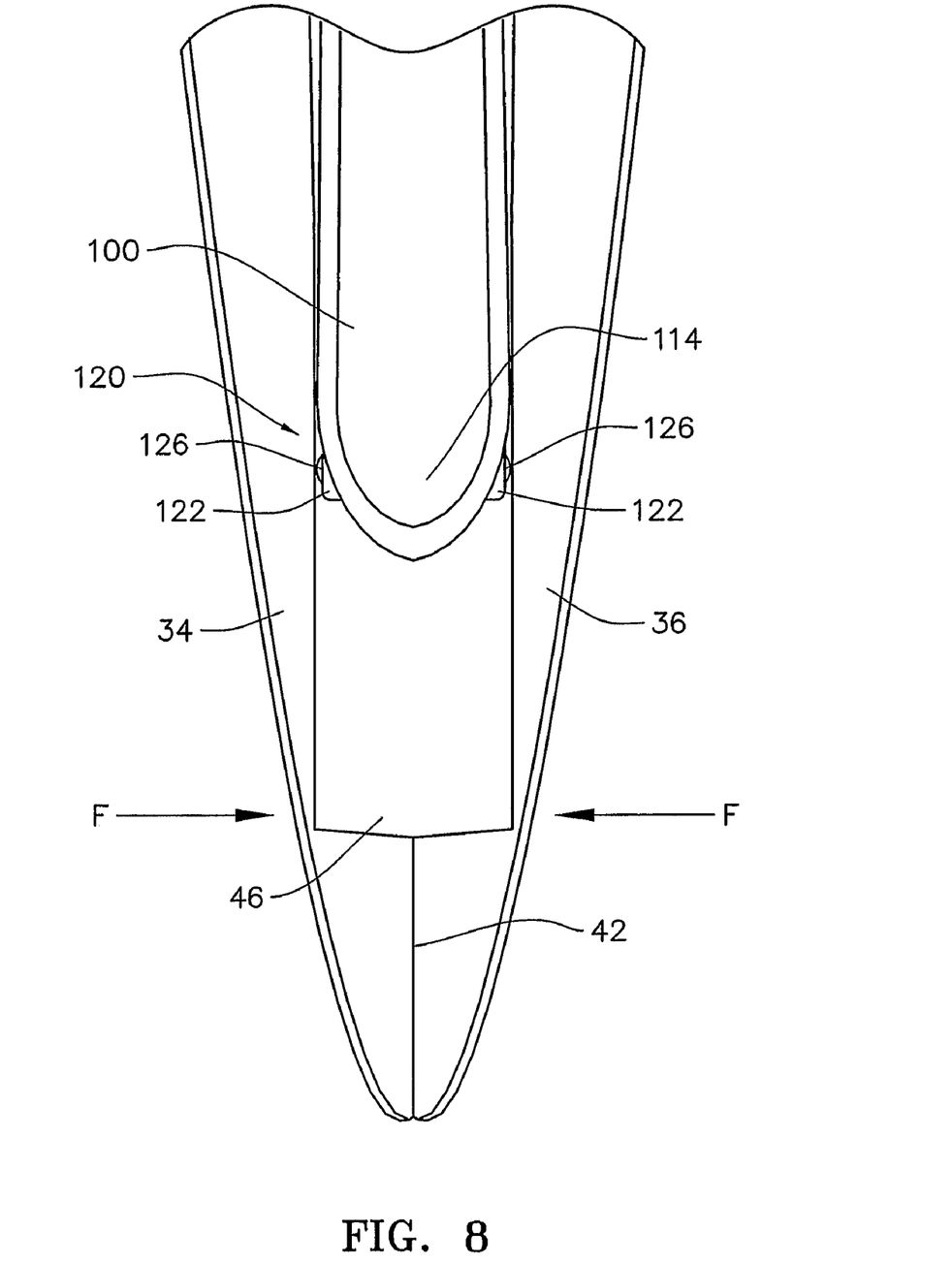
FIG. 8 is a detailed rear elevation view of the egress end of the wear resistant seed tube of FIG. 5 disposed between the opener disks.

FIG. 8 illustrates a rear view of the embodiment of the wear resistant seed tube 100 of FIG. 5 installed in the furrow opener 24. It should be appreciated that the wear resistant rods 126 will contact the disks 34, 36 before the sidewalls 106, 108 of the seed tube 100. It should also be noted that the overall width of the two rods 126 in their assembled position should be approximately equal but slightly less than the width of the seed tube guard 46. It is desirable that the seed tube guard 46 remain the primary structure to resist the inward forces F and to hold the disks 34, 36 apart, whereas the rods 126 comprising the wear member 120 serve only to minimize wear of the seed tube walls 106, 108 by preventing direct contact between the side walls 106, 108 of the tube and the opener disks 34, 36 during planting operations.

Figures 9, 10:
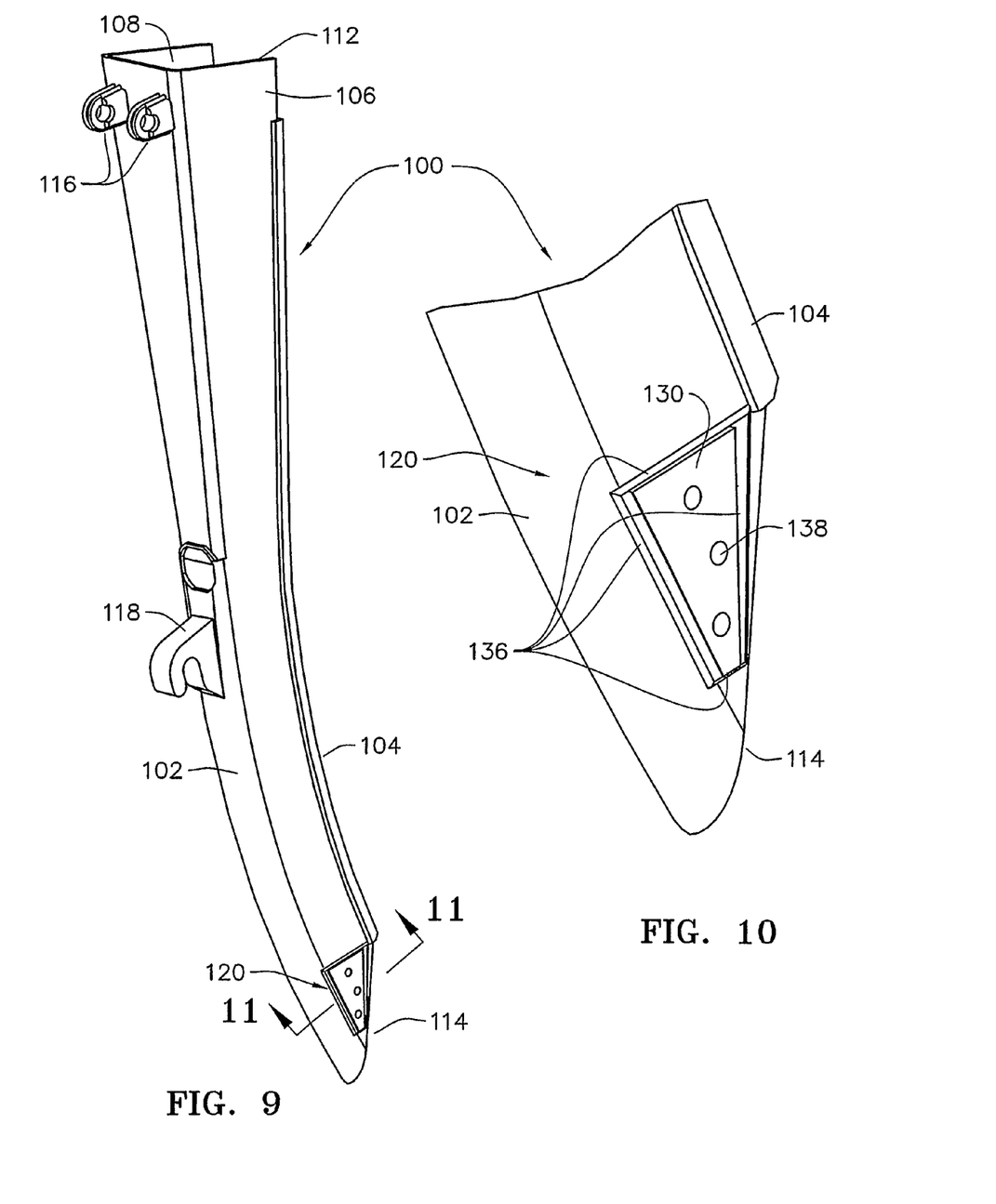
FIG. 9 is a perspective view of another embodiment of the wear resistant seed tube of the present invention.
FIG. 10 is a detailed perspective view of the egress end of the wear resistant seed tube of FIG. 9.
Figure 11:
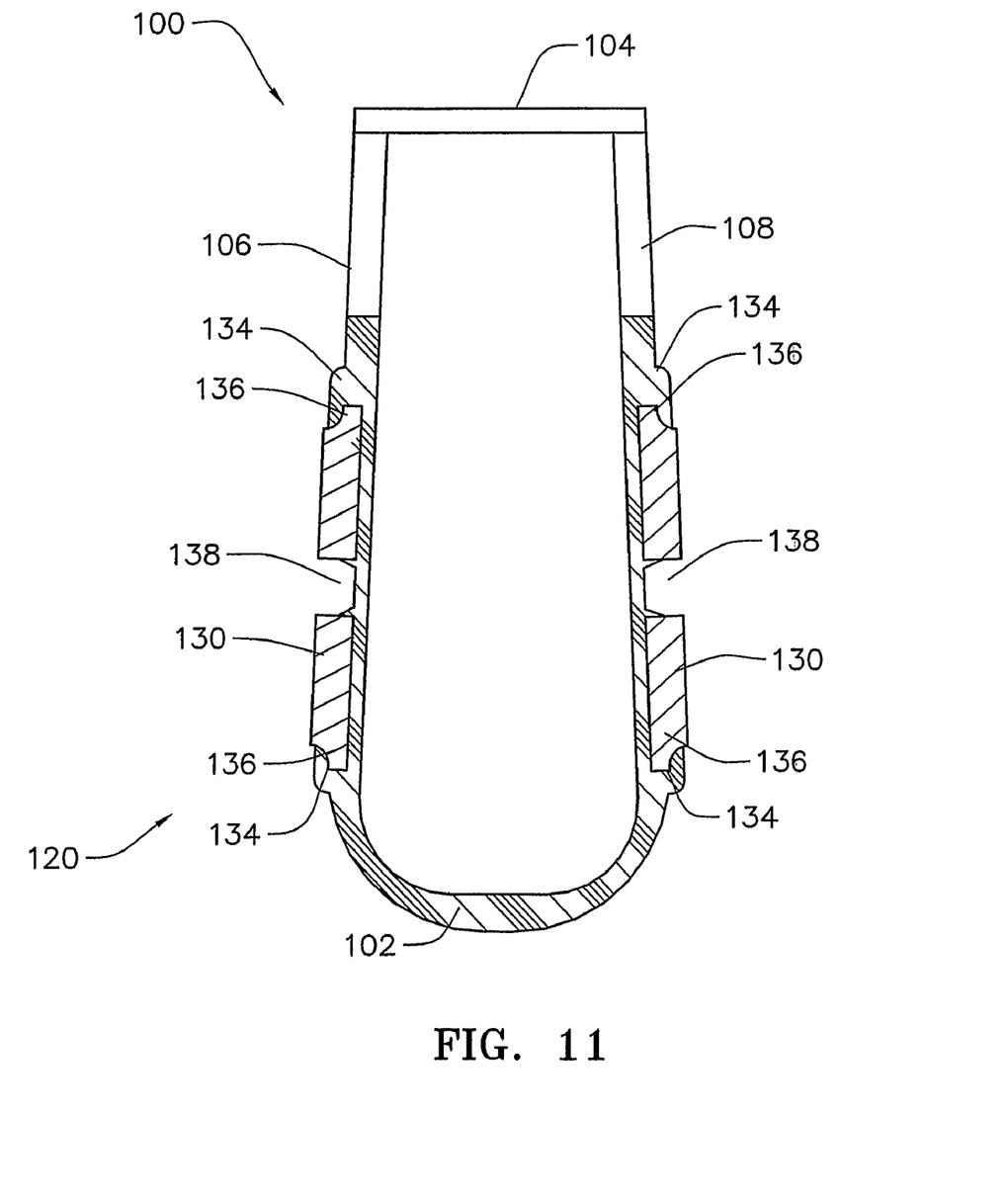
FIG. 11 is a cross-sectional view of the egress end of the wear resistant seed tube of FIG. 9 as viewed along lines 11-11 of FIG. 9.

FIGS. 9 through 11 illustrate an alternative embodiment of the wear resistant seed tube 100 of the present invention. In the embodiment of FIG. 9, the wear member 120 comprises a trapezoidal shaped wear resistant insert 130. The insert 130 may be heat-treated metal, such as produced through a powdered metal process. Alternatively, the insert 130 may be ceramic or other suitable wear resistant material. FIG. 10 illustrates a detailed view of this embodiment of the wear member 120. FIG. 11 is a cross-sectional view of the wear resistant seed tube 100 as viewed along lines 11-11 of FIG. 9. The wear resistant insert 130 is preferably secured to the tube 100 through the process of insert-molding, wherein the insert is placed into the seed tube mold and plastic resin is injected around the insert 130, thereby fixing it in place. Retention ribs 134 are preferably disposed around the insert 130 and are preferably formed over flanges 136 about the periphery of the insert in order to securely retain the insert 130 in position. As with the rods 126 in the previous embodiment, the outer face of the insert 130 is preferably positioned to be provide a first point of contact with the disks 34, 36 during use. It should be understood that the lower edge of the insert 130 will generally be the only area of the insert 130 that makes contact with the disks 34, 36 but the insert 130 is preferably sized to facilitate handling and provide sufficient area to ensure the insert 130 remains securely fixed in place and to sufficiently dissipate any heat generated by the insert-to-disk contact during planting operations. In a preferred embodiment, apertures 138 are preferably provided to further securely fix the insert 130 to the sidewalls 106, 108 of the tube during the molding process.

Although only an exemplary embodiment of the invention has been described in detail above, those skilled in the art will readily appreciate that many modifications are possible without materially departing from the novel teachings and advantages of this invention. The above descriptions have focused on the application of the present invention to double-disk opener style planters but the invention applies equally to single-disk style openers without departing from the scope of this invention. Accordingly, all such modifications are intended to be included within the scope of this invention as defined in the following claims.

The invention claimed is:

1. A seed tube adapted to be disposed between furrow opening disks of an agricultural planter, said seed tube comprising;
   a rearwardly curving forward wall, a rearwardly curving rearward wall and opposing sidewalls defining a seed passageway which curves rearwardly from an upper ingress end toward a lower egress end through which seeds exit said passageway before being deposited in the furrow formed by the furrow opening disks;
   wear resistant material disposed proximate said egress end such that said wear resistant material prevents appreciable wear of said egress end when said egress end contacts said furrow opening disks during planting operations, wherein appreciable wear would effect seed trajectory as the seeds exit said passageway.

2. The seed tube of claim 1 wherein said wear resistant material is press-fit into a bore in each of said sidewalls proximate said egress end.

3. The seed tube of claim 2 wherein said wear resistant material is tungsten-carbide.

4. The seed tube of claim 1 wherein said wear resistant material is insert-molded in each of said sidewalls proximate said egress end.

5. The seed tube of claim 4 wherein said wear resistant material is tungsten-carbide.

6. The seed tube of claim 1 wherein said wear resistant material is adhesively bonded to said sidewalls proximate said egress end.

7. The seed tube of claim 6 wherein said wear resistant material is tungsten-carbide.

8. A seed tube for an agricultural planter having furrow opening disks, said seed tube comprising;
   a rearwardly curving forward wall, a rearwardly curving rearward wall and opposing side walls defining a seed passageway which curves rearwardly from an upper ingress end toward a lower egress end through which seeds exit said passageway before being deposited in a furrow;
   wear resistant material disposed to provide a first point of contact with the opening disks such that said wear resistant material prevents appreciable wear of said egress end when said egress end contacts said furrow opening disks during planting operations, wherein appreciable wear would effect seed trajectory as the seeds exit said passageway.

9. The seed tube of claim 8 wherein said wear resistant material is press-fit into a bore in each of said sidewalls proximate said egress end.

10. The seed tube of claim 9 wherein said wear resistant material is tungsten-carbide.

11. The seed tube of claim 8 wherein said wear resistant material is insert-molded in each of said sidewalls proximate said egress end.

12. The seed tube of claim 11 wherein said wear resistant material is tungsten-carbide.

13. The seed tube of claim 8 wherein said wear resistant material is adhesively bonded to said sidewalls proximate said egress end.

14. The seed tube of claim 13 wherein said wear resistant material is tungsten-carbide.

15. A seed tube for an agricultural planter having furrow opening disks, said seed tube comprising;
   a rearwardly curving forward wall, a rearwardly curving rearward wall and opposing side walls defining a seed passageway which curves rearwardly from an upper ingress end toward a lower egress end through which seeds exit said passageway before being deposited in a furrow;
   wear resistant material disposed to prevent appreciable wear of said egress end when said egress end contacts said furrow opening disks during planting operations, wherein appreciable wear would effect seed trajectory as the seeds exit said passageway.

16. The seed tube of claim 15 wherein said wear resistant material is press-fit into a bore in each of said sidewalls proximate said egress end.

17. The seed tube of claim 16 wherein said wear resistant material is tungsten-carbide.

18. The seed tube of claim 15 wherein said wear resistant material is insert-molded in each of said sidewalls proximate said egress end.

19. The seed tube of claim 18 wherein said wear resistant material is tungsten-carbide.

20. The seed tube of claim 15 wherein said wear resistant material is adhesively bonded to said sidewalls proximate egress end.

21. The seed tube of claim 20 wherein said wear resistant material is tungsten-carbide.

* * * * *